Figure 1:
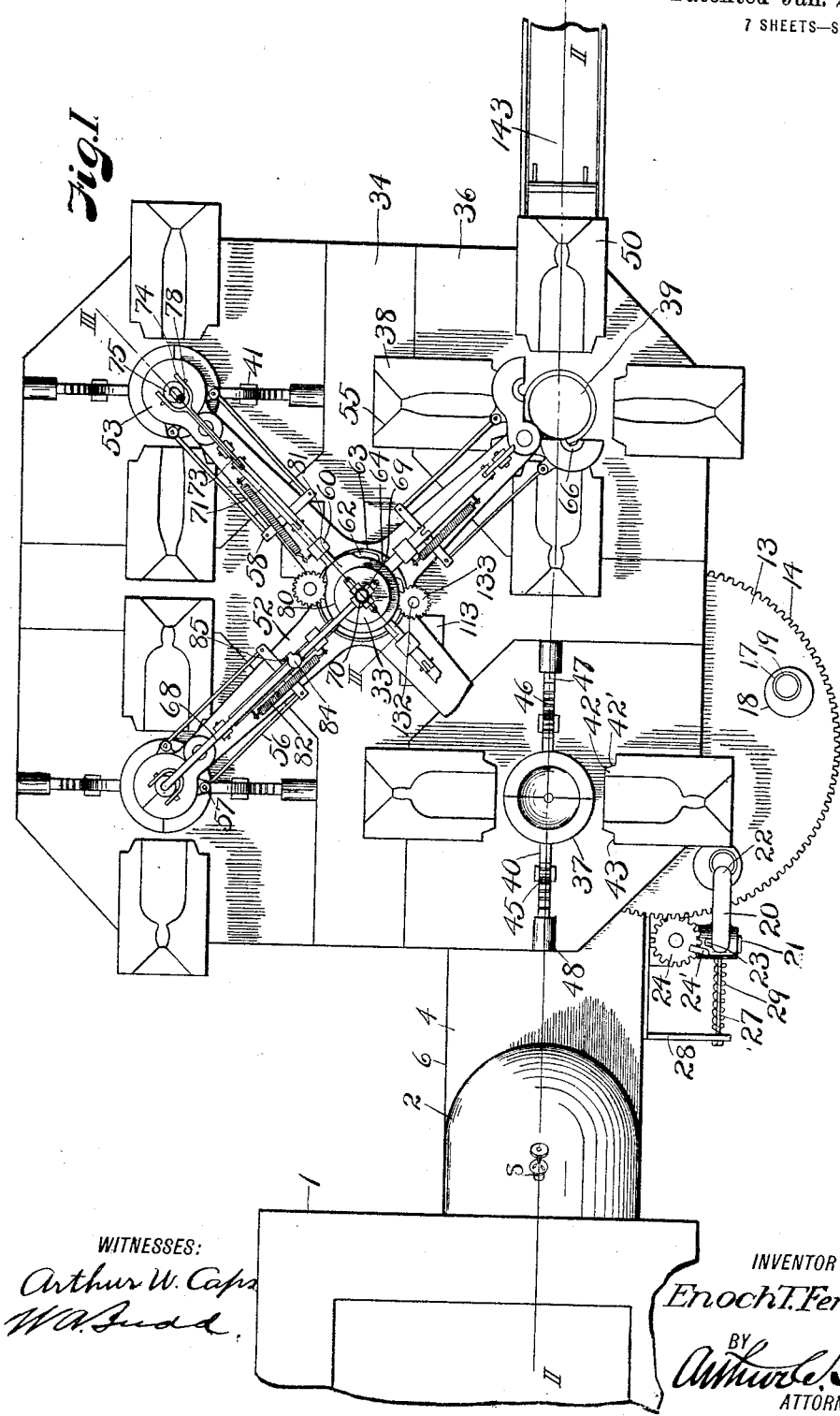

E. T. FERNGREN.
GLASS MOLDING APPARATUS.
APPLICATION FILED MAR. 11, 1912.

1,328,273.

Patented Jan. 20, 1920.
7 SHEETS—SHEET 1.

WITNESSES:
Arthur W. Cap
W. A. Judd

INVENTOR
Enoch T. Ferngren
BY
Arthur E. Brown
ATTORNEY

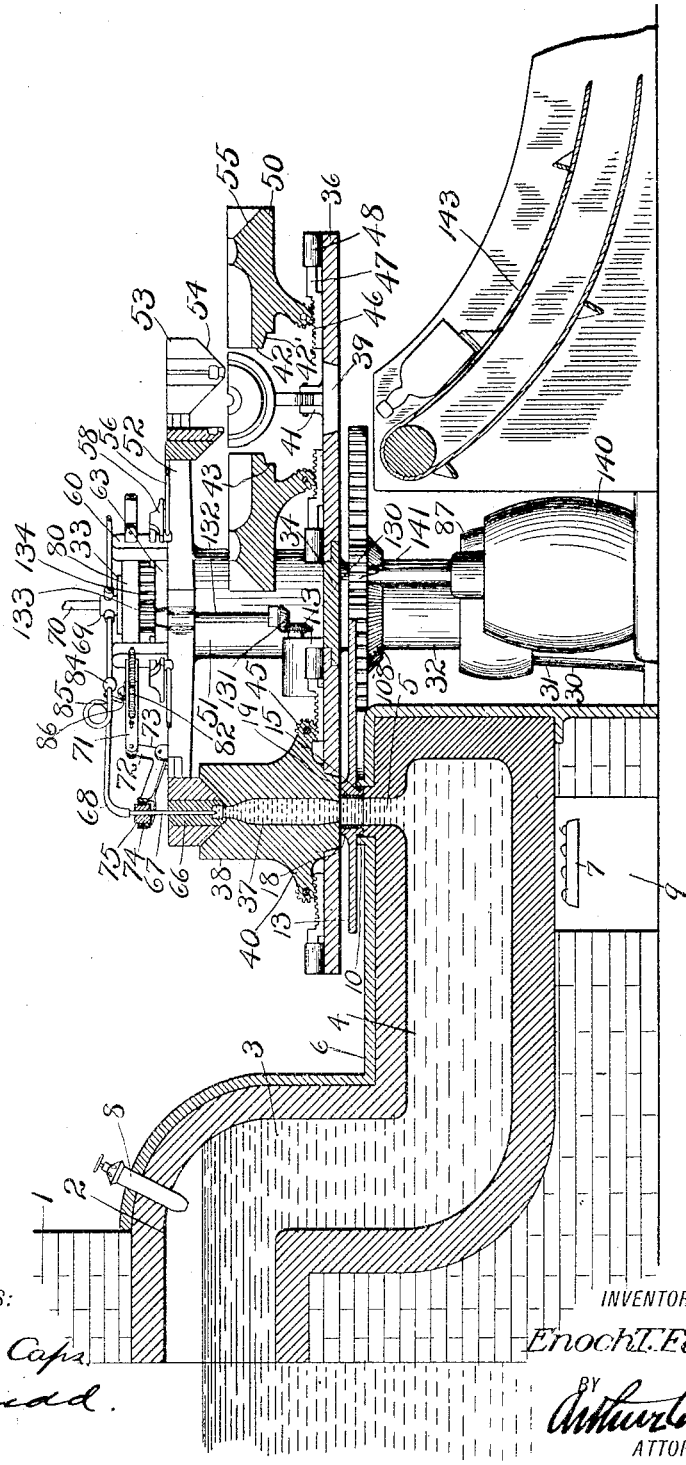

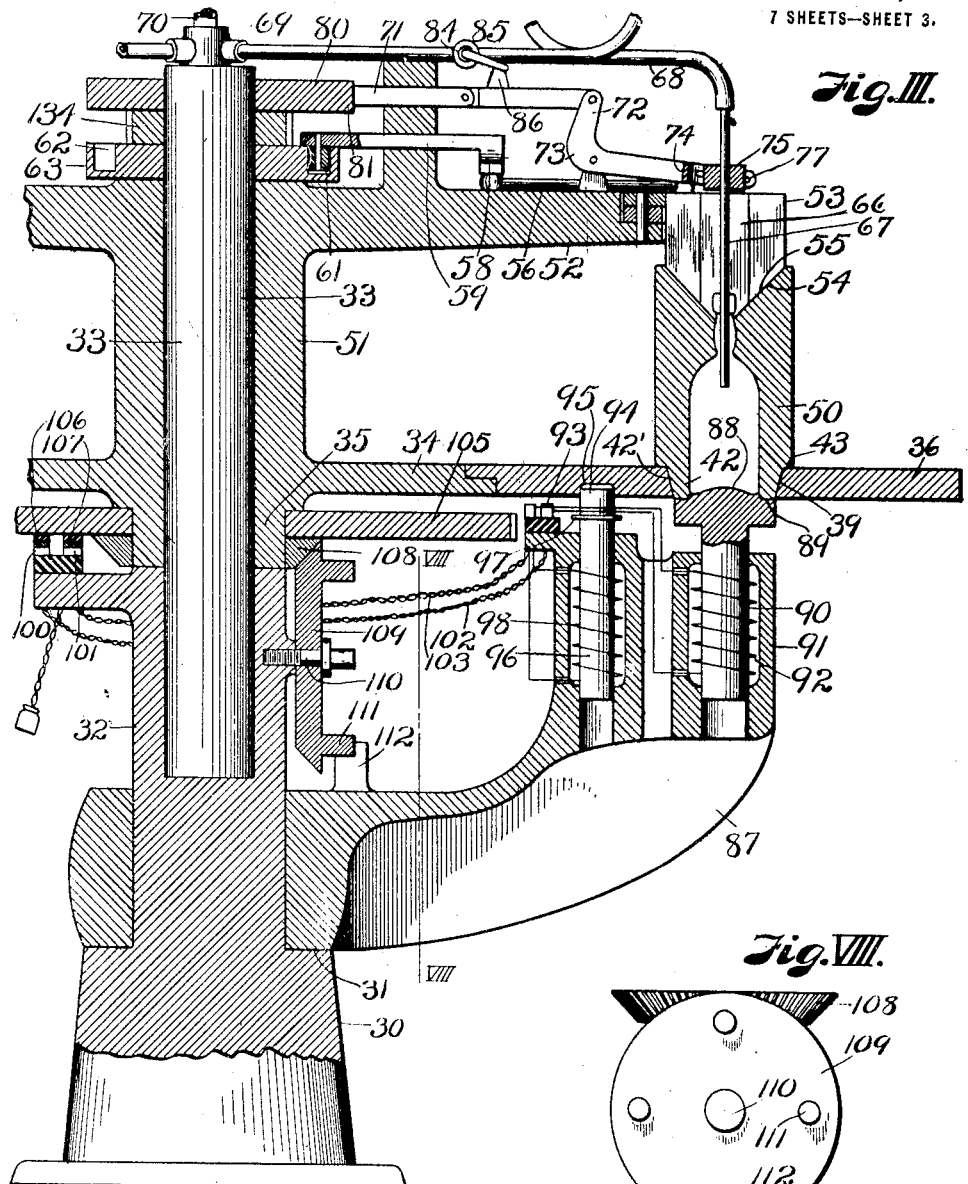

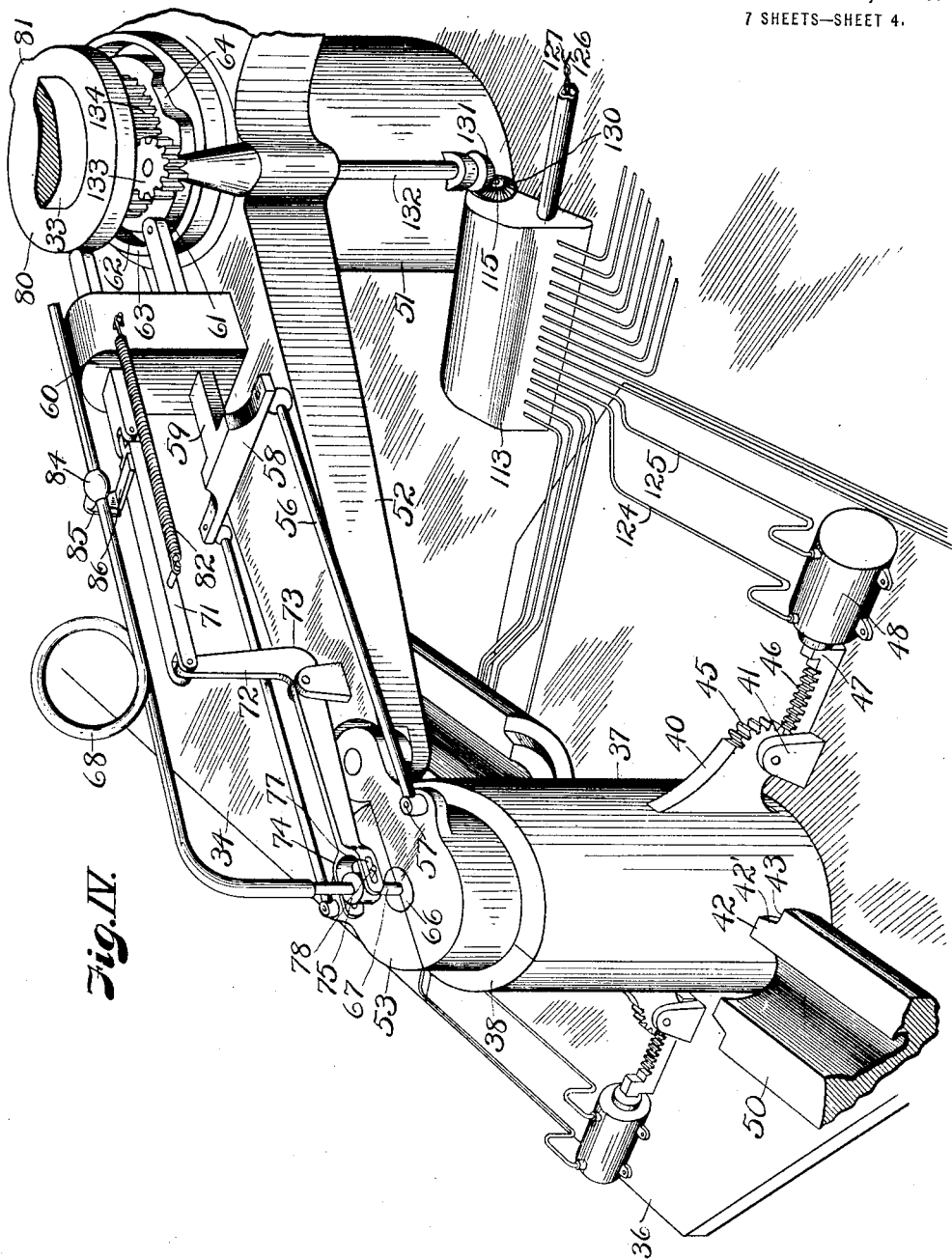

E. T. FERNGREN.
GLASS MOLDING APPARATUS.
APPLICATION FILED MAR. 11, 1912.
1,328,273.
Patented Jan. 20, 1920.
7 SHEETS—SHEET 5.
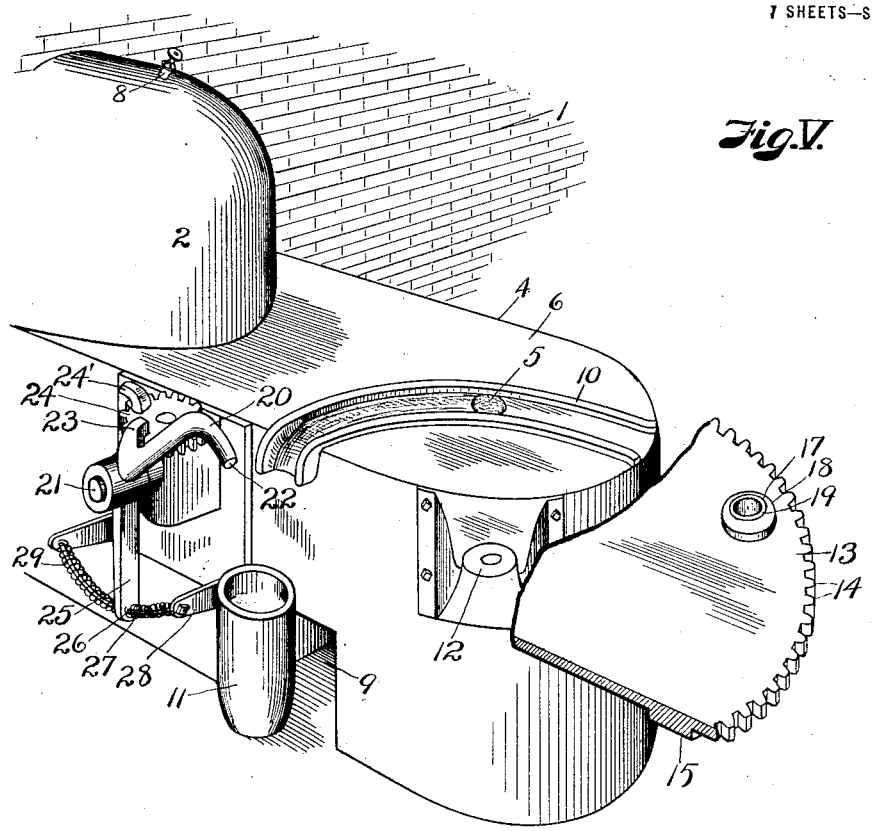
Fig. V.
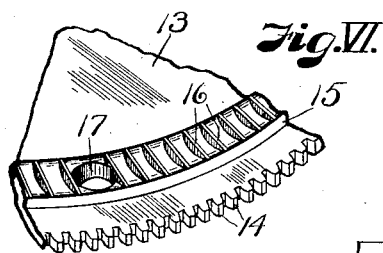
Fig. VI.
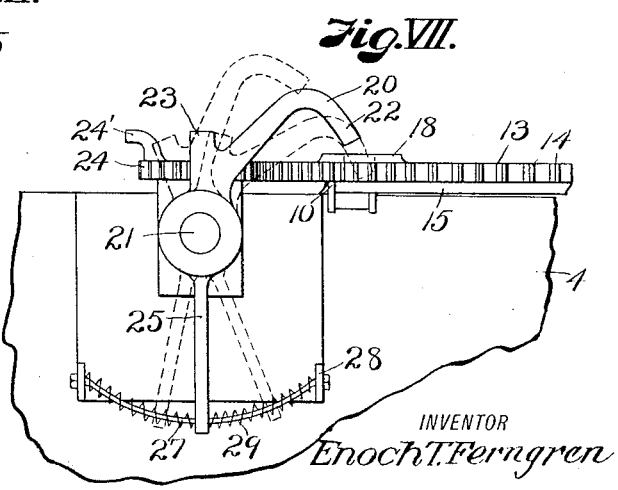
Fig. VII.
WITNESSES:
Arthur W. Caps.
J. W. Budd.
INVENTOR
Enoch T. Ferngren
BY
Arthur W. Brown
ATTORNEY E. T. FERNGREN.
GLASS MOLDING APPARATUS.
APPLICATION FILED MAR. 11, 1912.
1,328,273.
Patented Jan. 20, 1920.
7 SHEETS—SHEET 6.
*Fig. IX.*
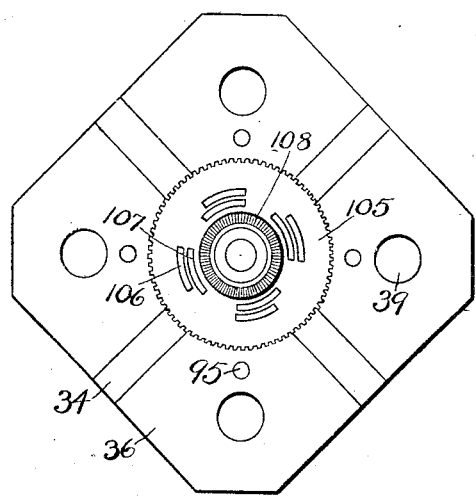
*Fig. X.*
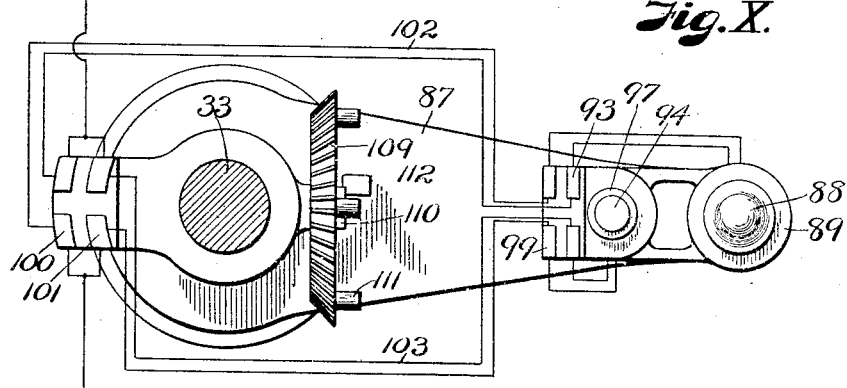
*Fig. XI.*
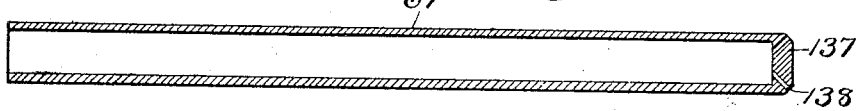
*Fig. XII.*
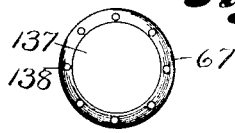
WITNESSES:
Arthur W. Caps.
W. A. Budd.
INVENTOR
Enoch T. Ferngren.
BY
Arthur C. Brown
ATTORNEY E. T. FERNGREN.
GLASS MOLDING APPARATUS.
APPLICATION FILED MAR. 11, 1912.
1,328,273.
Patented Jan. 20, 1920.
7 SHEETS—SHEET 7.
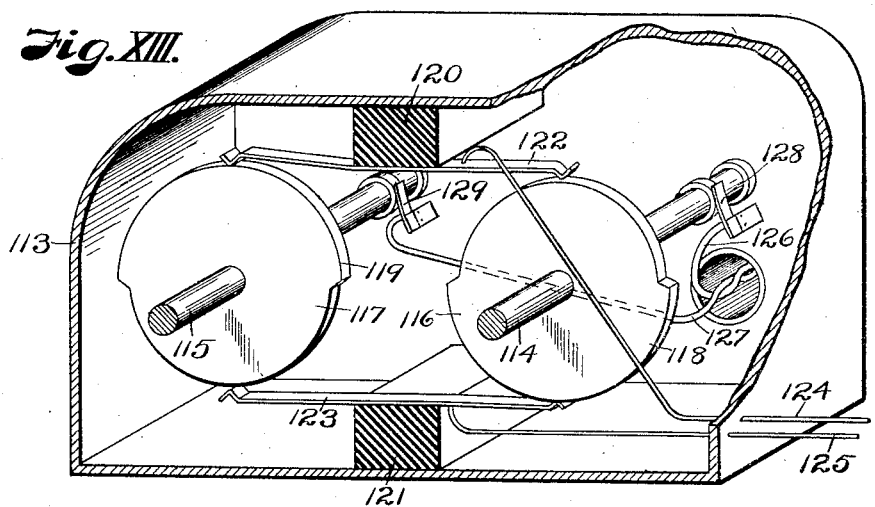
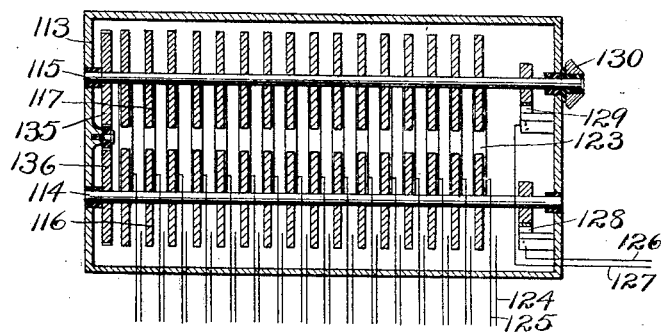
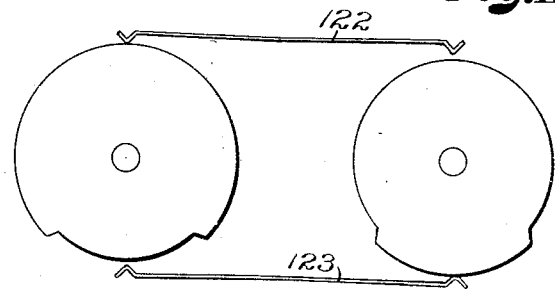
WITNESSES:
Arthur W. Caps.
INVENTOR
Enoch T. Ferngren.
BY
Arthur C. Brown
ATTORNEY

UNITED STATES PATENT OFFICE.

ENOCH T. FERNGREN, OF KANSAS CITY, MISSOURI.

GLASS-MOLDING APPARATUS.

1,328,273.  Specification of Letters Patent.  Patented Jan. 20, 1920.

Application filed March 11, 1912. Serial No. 682,895.

*To all whom it may concern:*

Be it known that I, ENOCH T. FERNGREN, citizen of Sweden, residing at Kansas City, in the county of Jackson and State of Missouri, have invented certain new and useful Improvements in Glass-Molding Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to means and the process used therein for molding glass and its objects are to provide ways and means for the formation of glass articles, particularly bottles from glass forced upward into a mold by hydrostatic pressure.

Another object of this invention is the formation of a blank of molten glass in one mold and its subsequent blowing in another substituted mold, to the form of the glass article desired. Hereinafter the formation of bottles in accordance with my invention will be treated, as an example.

A further object of this invention is to provide means for automatically opening and closing the blank and bottle molds at proper intervals to receive and deliver same and to turn on and cut off the air by means of which the bottles are formed.

It is a further object of this invention to provide mechanism for skimming and removing glass as it issues from the discharge port in between the times of filling the blank molds, to permit the glass to continue to flow from said discharge port and thus insure an immediate supply of fresh molten glass of a practically even temperature throughout and of homogeneous consistency, when charging the molds. In this way glass is not allowed to congeal in the said discharge port and glass of the proper consistency for blowing is had.

Other objects of the invention will be mentioned in the following specification, in which reference is had to the accompanying drawings, wherein:—

Figure I is a plan view of a glass blowing apparatus constructed according to my invention, showing a part of the furnace.

Fig. II is a vertical section on the line II—II, of Fig. I, showing the feeding conduit, a bottle blank in a blank mold and illustrating two open molds.

Fig. III is a vertical section on the line III—III, of Fig. I, showing the spindle about which the revoluble members move, and illustrating in section one of the bottle molds with the operated solenoid bottom and stop.

Fig. IV is an enlarged perspective view of the molding sets and carrying arms, showing one set assembled and illustrating the gearing for actuating the parts and for controlling the solenoids.

Fig. V is a perspective view of the conduit with the table removed to show the feed port and skimming table with the cleaning mechanism.

Fig. VI is an inverted perspective of a part of the skimming table.

Fig. VII is a side view of part of the table and the cleaning hammer, showing the latter in various positions in dotted lines.

Fig. VIII is a side elevation of the gearing for returning the solenoid arm to its initial position after each molding operation, the arm being in section taken on the line VIII—VIII, of Fig. III.

Fig. IX is an inverted plan view of the table and gear wheel showing the brushes for controlling the solenoids.

Fig X is a cross section of the standard immediately below the brush gear wheel, showing the mold bottom and stop plunger cores.

Fig. XI is a longitudinal sectional view of the sprue.

Fig. XII is an end view of same, showing the air ports.

Fig. XIII is a perspective view of part of the contact mechanism for controlling the various solenoids that open and close the blank and bottle molds, the blank controlling contact being illustrated.

Fig. XIV is a horizontal section of the said contact mechanism.

Fig. XV is an end view of one of the contact sets for opening and closing the bottle molds.

Referring more in detail to the parts:—

1 designates a glass furnace of any suitable type having an outlet conduit 2 adapted for taking molten fluid from the upper level in the furnace and having a down turned neck 3 terminating in a horizontal section 4, the upper portion of which is below the level of the fluid in the furnace. At the end of the horizontal section 4, and opening through the top thereof, is a neck 5 through which molten glass may be forced by hydrostatic pressure caused by the body of molten glass in the upper portion of the conduit and in the furnace proper. The conduit is preferably provided with a metal casing 6 and raised from the floor so that burners 7 may be placed therebeneath within a space 9 provided for that purpose, in order to heat the molten glass at the end of the conduit and prevent same from congealing in the conduit or in the vertical feeding neck. I also preferably provide a torch, or the like, 8 in the conduit, adjacent to the furnace, whereby the outflowing glass may be heated as it passes beneath the torch. On the casing 6 are curved flanges 10 which straddle the port of the feeding neck 5 and form a trough on the top of the casing, the receiving end of which is flared and the delivery end of which is turned down over the side of the conduit to drop skimmings into a pot 11 which may be provided for that purpose.

Journaled in a bearing 12 on the conduit at the axis of the trough flanges 10 is a table 13 having peripheral gear teeth 14 adapted for operative engagement with a driver, hereinafter described, and having an annular boss 15 on its under face adapted for travel in the trough 10, the under face of said boss being cupped and provided with spaced skimming plates 16, which travel through the trough in contact with the top of the casing, to constantly carry off molten glass, delivered up through the neck 5, in order to constantly provide a non-congealed supply of molten glass to the molds. The top surface of the casing 6 becomes highly heated, particularly around the delivery opening of the neck 5, where the molten glass issues. The recurrent moving contacts of the edges of the spaced partitions 16 with this portion of the surface serves to absorb a portion of the heat which is transferred to the edges of the partitions, and at the same time the constant movement maintains a smooth condition on the surface between curved flanges 10. Any suitable cooling agency may be used to establish relatively proper temperature relations between the edges of the plates 16 and the surface of the casing inside of the flange, and as a lubricant between the flanges and the surface and the edges of the skimming plates, deflocculated graphite is specially effective; however other lubricant may be used to advantage, depending largely upon temperature conditions and the density and refractory nature of the metals used in the construction of the contacting parts. A soft cast iron may be used for the skimmer, although copper alloys or aluminum alloys may be used. The casing that is constantly exposed to a higher temperature should preferably be composed of a metallic alloy of a refractory and hard nature, such as are provided by the addition of tungsten, molybdenum and tantalum, or other refractory metal to any of the well known less refractory metals.

The molten glass as it issues through the neck 5 moves with a relatively high velocity due to the pressure from the fluid level maintained above the portion 3 of the conduit, which pressure as the glass is released through the discharge port is transformed into motion, and causes a speedy flow of glass out through the neck 5 into the cavities of receptacles between the partition plates 16, as they travel over the port; the glass rapidly filling each cavity, and while so doing the glass flows in all directions as it issues, spreading out over the edge of the discharge opening, simultaneously to its occupation of the inclosed space provided thereabove, during which action the edges of the skimming plates or partitions 16 divide the issuing glass and successively sever the same into portions as each plate is moved across the discharge opening. The pressure causes the glass to flow out from the feed port or discharge opening in a full volume, which is also partially due to the fluidity sustaining temperature which is transmitted to the glass and maintained in the walls of the discharging end of the conduit by burners 7, so that the rapid and voluminous delivery of a high temperature glass tends to constantly combat and dissipate the incipient congealing effect which is imparted by the edges of plates 16 to that portion of the glass that is issuing or flowing in direct and close contact with the edge or rim of the discharge opening; the lateral flaring out or spreading of the flowing glass to all sides of the discharge opening during the movement of the plates 16 thereover tends to distribute heat units around and beyond the edge of the port opening, thereby extending the area of the highly heated zone to the upper surface of the casing, and assisting in maintaining a high enough temperature at the edge of the feed port, preventing a loss of fluidity in the surface or exterior of the glass as it flows out around the periphery of the feed port.

Opening through the table 13 and boss 15, are four bored holes 17, which are adapted for registration with the neck 5, to receive material therefrom, and on the top of the table are posts 18, through which and through the table, are projected steel bushings 19, through which the molten glass is forced and the edges of which are adapted for shearing slightly congealed glass without dulling. Posts 18 are preferably arranged eccentrically on the bushings with the longer section at the rear side relative to the direction of the travel, in order to provide a wiping surface when the mold is fed through a bushing. When the glass is delivered from the neck 5 through the bushings 19 to the molds, the flowing glass is speeded or forced according to the static pressure level or head of glass provided, and as the glass leaves the feed neck 5, it first occupies the passage in the bushing 19, where the glass that contacts in its surface portion with the lower temperature bushing becomes plastic and less mobile, while the interior liquid portion of the glass arises and progressively unfolds or wells up into the bore of the mold, insuring by said action of flow that the interior of the mold is progressively contacted with virgin glass as the glass occupies the same. By increasing the pressure level of glass above the intake portion 3 of the conduit, or by constructing the conduit so that the discharge neck opens on a lower level than shown in Fig. 2, a greater hydrostatic pressure becomes available, whereby the velocity of the flowing glass can be greatly increased and the glass delivered into the molds and the cavities in the skimmer with a greater pressure impact.

It is apparent that when carrying off a thin film or small portions of molten glass, that the latter will congeal rapidly if allowed to remain in the skimming cups and thereby tend to clog the feeding port if not removed from the cups before the latter are again moved over the port opening. In order to prevent this disadvantage I have provided a cleaner, the preferred form of which comprises a punch 20, which is pivotally mounted on a stub shaft 21, at the side of the casing and has a head 22, adapted for downward travel through the bushings 19, when the latter are carried therebeneath. The rear end of the punch has a dog 23, projected into the path of a lug 24' on a small gear wheel 24, constantly meshing with and actuated by the gear teeth 14, of the feeding table 13.

Depending from the punch 20 is an arm 25, having an aperture 26, through which a wire 27, carried by bracket arms 28, is projected, said wire being bent to an arch having the shaft 21 as a center and provided on opposite sides of the arm with compression springs 29 whereby said arm is yieldingly retained in a central position beneath the shaft. It is apparent that as the gear table 13 is revolved, the punch will be lowered to pass through the bushings 19 and force the glass therefrom, being returned after the lug 24' has left the dog 23, through the medium of the compression springs 29. The gear 24 is sufficiently small to actuate the punch between each positioning of the bushings 19, so that it is forced against the upper face of the gear table 13 and acts as a hammer to jar the semi-congealed glass out of the buckets in the skimmer, thereby assuring a constant removal of glass from the feeding port, as the skimmer operates thereover.

It is apparent that the glass which is carried off from the feed port in the skimmer buckets or cavities may be utilized in forming various small articles of glassware, if a series of molds are arranged to receive said glass. The glass contained in each skimmer bucket is not so far congealed and chilled that it cannot be used in press forming solid shapes of glassware. In fact, if the skimmer cavities are enlarged so that each bucket will receive a larger quantity of glass, the resultant blank of glass may be transferred to blank molds and blow molds, and expanded into a bottle or other shapes of blown glass.

Mounted on a suitable platform adjacent to the end of the horizontal section 4, is a standard 30, having a horizontal shoulder 31 and a cylindrical post 32 (see Fig. III) above the shoulder. Fixed in and rising from the upper part of the post is a spindle 33, around which a table 34 is adapted to revolve. Said table has a collar 35 supported on the standard post. The table 34 has removable corner sections 36, each provided with blank and bottle molds and means for actuating same, said molds being of any desirable pattern and mounted on the removable table sections in order that the patterns may be changed by changing the removable sections, without interfering with the rest of the apparatus, and in order to avoid necessity of providing a complete apparatus for each individual pattern. On each of the table sections is a blank mold 37 comprising a pair of members 38, arranged at diametrically opposite sides of a base opening 39 and having ears 40 pivotally mounted in yokes 41, on the mounting section, the lower edges of the mold members having offset semi-circular tongues 42 with beveled outer faces 42' adapted for projection into the bottom opening, when the mold member is revolved and for seating on an annular shoulder 43, when the two members of the mold are in contact. The mold members are actuated through the medium of a gear section 45 on each ear 40, which meshes with a reciprocating rack 46 on a solenoid core 47, which is mounted in a case 48 on the removable table section, such magnet being adapted for automatically reciprocating the core at proper intervals, to close and open the mold, as will presently be more fully described.

Mounted on each section 36, at right angles to the blank mold members are bottle mold members 50, which are of the same construction as the blank molds, except as to contour of the inner chamber and are operated by the arms 40 and solenoid racks, as described. Neither the blank nor bottle mold has a neck or base forming part, such parts being on independent mountings, as will presently be described.

Integral with the table 34 is a sleeve 51, which is also adapted for revolution around the spindle 33 and has arms 52 extending radially over the feeding openings 39 of the removable table sections, there being one of said arms for each mold position. Pivotally mounted on the free end of each arm are the divided neck members 53, having inverted cone shaped lower ends 54, adapted to fit snugly within the conical sockets 55 in the tops of the blank and bottle molds, such conical construction being provided so that the mold parts may open relative to each other. Each of the individual neck members has an operating rod 56, pivotally mounted on a pin 57, projecting eccentrically from the member, relative to its mounting, the rods on the separate members being connected with a common cross head 58 on a slide 59, which is projected through a standard 60, on the arm 52, and has a cam roller 61, projected into a cam groove 62, of a plate 63, rigidly mounted on the stationary spindle 33, said path having a single inwardly offset section 64, whereby the slide 59 is moved rearwardly to separate the neck members 53 and open that part of the mold once during each complete revolution of the table.

Each of the bottle necks has a steel bushing 66, through which a sprue 67 is slidably projected, the bushing being adapted to allow the sprue to slide vertically with a minimum of lost motion, and the latter being connected with and carried by a flexible metal tube 68, which is in turn connected with and carried by a union 69 on a main supply tube 70, that leads to a suitable compressor, or the like.

As it is desirable that the sprue be lowered in the bottle mold during the blowing period, I have provided means for vertically reciprocating same, including a slide 71, which is also carried by the standard 60 and is preferably jointed to allow for a vertical movement. At its outer end, the slide 71 is pivotally connected with a vertically extending arm 72 of a bell crank lever 73, the opposite arm of which has a yoke 74 straddling a collar 75, that is fixed on the sprue 67, the arms of the yoke having slots 77 through which pins 78 on the collar are projected to provide for lateral movement of the lever without like movement of the sprue. The slide 71 has its inner end in abutment against the periphery of a cam disk 80, having a boss 81 adapted for engaging the slide 71 to move same longitudinally to lower the sprue and the slide 71 being equipped with a spring 82, whereby it is returned to yielding engagement with the body of the cam disk 80 after it has passed the boss. As it is only necessary for air to be delivered through the sprue for a small part of the revolution of the table, and as this period should be during the lowering of the sprue in the bottle mold, I have provided the auxiliary supply tube 68 with a self-closing valve 84, having a controlled lever 85 projected into the path of a finger 86, which is carried on the slide 71, and is adapted for rocking the valve open and shut and to open same against the tension of its self-closing means, the parts being so arranged that the finger will not lose its contact with the lever during this opening travel and the parts will move forwardly and back in contact. Inasmuch as the valve 84 may be of any suitable self-closing type, I have not illustrated same in detail. As the bottle mold needs a bottom only during the blowing period, I have provided but a single bottom die which may be used with each of the separate molds on the table, such member being mounted on an arm 87, which is pivotally mounted on the standard 30 and carried by the shoulder 31. This die preferably comprises a face member 88, which is adapted for movement into the bottom of the mold chamber and has annular shoulders 89 for abutment against the bottom of the mold to seal the chamber. Integral with and depending from the lower face of the die, is a plunger 90, which serves as a solenoid core and projects through a core box 91 on the arm 87, being surrounded by the usual winding 92, the poles of which are connected with separate binding posts 93 on the end of the arm 87. Mounted in like manner, adjacent to the mold bottom plunger is a stop plunger 94, the upper end of which is adapted for projection into sockets 95 in the bottom of the mold table and the lower portion of which comprises a solenoid core 96 and a collar 97 being provided for preventing the plunger from dropping through the core box. The coil 98 of the stop plunger 94 is connected with binding posts 99 and leading from the posts 93 and 99 to brushes 100 and 101 on the standard boss 32, are circuit wires 102 and 103, shown in Fig. III, as ordinary cords. Fixed on the table collar 35 is a gear 105 and on the bottom of the gear are brushes 106 and 107, the brushes 107 being adapted for completing the stop plunger circuit, to lift the plunger and lock the table, such brushes being longer than the mold bottom plunger, in order that they may first contact with their mating brushes and lift the stop plunger to lock the table before the mold bottom plunger is lifted to close the mold, thereby obviating any danger of damaging the mold bottom die by passing the movable parts thereagainst.

As before stated, the mold members should be covered at the bottom only for a limited portion of the tables, travel, and I, therefore, oscillate the arm 87 between two positions, so that the same bottom plunger may be used for all of the molds. It is apparent that on account of the looseness of the arm 87 on its mounting and the stop plunger core 94 being locked with the table, the arm 87 will be caused to move with the table. In order to return the arm after the plunger is free, I fix to the gear 105, a beveled gear 108, which meshes with a gear 109 on a stub axle 110, carried by standard boss 32 and provided with studs 111, which are adapted for engaging a boss 112 on the arm 87, so that the arm may be revolved when one of the revolving studs engages the boss. It is apparent that by providing the gear 109 with as many studs as there are molds on the mold table and spacing said studs equally around the gear, that the arm may be moved back to coöperate with each mold as it reaches a determined position.

Referring now to the means for controlling the solenoids, for actuating the blank and bottle molds, 113 designates a casing within which parallel shafts 114 and 115 are journaled. Fixed on said shafts are paired disks 116 and 117, having peripheral bosses 118 and 119. Fixed on insulated mountings 120 and 121, at the top and bottom of the casing, are brushes 122 and 123, the disk cams being arranged to alternately contact, what we may term, the positive and negative disks 116 and 117, the disks having their cams arranged oppositely as shown. Connected with each of the brushes 122 and 123, is a circuit wire 124 and 125, which extend to one of the magnets 48, and are adapted for energizing the core coil to move the latter longitudinally and in a direction determined by the contact of the brushes with the positive and negative cam disks. The disks are energized through main line wires 126 and 127, having brushes 128 and 129 wiping the shafts 114 and 115.

It is apparent that each magnet may have a pair of circuit openings and closing members, such as illustrated in Fig. XIII, and that by arrangement of the cam disks on the shafts, the magnets may be energized at proper intervals, relative to each other, so that the core and bottle magnets may be closed and opened in a regular order and at fixed positions, relative to the revolution of the table. The shaft 115 is revolved through the medium of a beveled gear 130, which meshes with a pinion 131, on a vertical shaft 132, having a pinion 133, at its upper end meshing with a gear wheel 134, on a standard spindle 33, so that as the table revolves around the spindle, the shaft 132 will be revolved and in turn revolve the conductor shaft 115, the gearing 133—134 being preferably two to one in order to limit the size of the wheel 133 so that the shaft 132 may lie close to the sleeve 51, and the gearing 131—130 one to two in order that the conductor shaft 115 may make one complete revolution to one revolution of the table around the spindle. The mating shaft 114 is revolved from the main shaft 115 and in the same direction through gear wheels 135 and an idler 136, and both of the shafts 114 and 115 are insulated from the casing and from the driving gear as shown in Fig. XIV.

While a sprue of any ordinary or well known construction may be used with this apparatus, I have illustrated a preferred form in Figs. XI and XII, wherein I show a tubular member 67, having a closed lower end 137 provided with an annular series of ports 138, whereby air may be blown downwardly and outwardly into the blank of molten glass to mold same against the inner surface of the mold chamber, into which the sprue is projected.

All of the movable parts, above described, are driven primarily from a motor 140, having a gear wheel 141 meshing with the wheel 105 on the table collar. 143 designates a conveyer which is adapted for receiving bottles delivered through the outlet openings 39 in the table and which may lead to an annealing furnace, or elsewhere.

In operation, assume that during the running of the apparatus, molten glass is supplied to the apparatus by a suitable furnace, adapted in capacity to meet the demand for a continuous flow required by the process of skimming and the successive filling of the blank molds charged for the formation of the glass articles desired, which in the case illustrated and described in a bottle, however the molds may be changed for other glass articles to be formed.

Beginning with the filling of the conduit 1, and connections to the feeding neck 5, terminating in a discharge port, the molten glass is forced upward through the said neck 5, by virtue of the hydrostatic pressure of the molten glass in the conduit 1 and connections. As the glass passes into the conduit 1 and on to the said neck 5, it is preferably reheated by torches 8 and burners 9, and emerges between the curved flanges 10, where it is skimmed off continuously by the skimming plates 16, while it flows upward through the neck 5 during the rotation of the table 13, until the bushing 19, of one of the holes 17, registers with the hole in the feeding neck 5, when, in the case of the formation of a very large bottle, the gear table 13 is momentarily stopped automatically, just long enough to permit of fresh molten glass, fully charging or filling the blank and neck-mold previously assembled and positioned above. Directly after the filling of the said blank and neck-mold the gear table 13 rotates in the same direction, as it started and the glass reaching from the neck 5 through the post 18, into the mold is severed by the shearing action of the moving bushing 19 with the mold and simultaneously the skimming plates 16 adjoining the bushing 19, shears with the edge of the port of the neck 5, leaving the hole 17 plugged with glass. The surface of the post 18 slightly congeals the bottom of the glass blank, to prevent its sagging tendency, and the flow of glass from the neck 5 is further skimmed away and removed until the next bushing 19 comes and stops, where the previous one did, and the molten glass flows up into and fills another blank mold, which replaced the first one filled. After the second blank mold has been filled, the gear table rotates again in the same direction and the process of skimming, removing, stopping for flow into blank molds, and severing the glass, continues in succession during the running of the apparatus. But the pockets between the skimming plates 16, and the cavity of the bushing 19, are freed of their surplus glass, through the force and jarring action of the punch 20, which is timed to operate by suitable mechanism, above described, when a bushing 19 comes into position to be cleared by the head 22 of the punch 20, and the dislodged glass drops into the pot 11.

The time required for charging a blank mold for small articles may be so small, that sufficient molten glass will be forced into the said blank mold during the eclipsing of the bushing 19 and the hole in the neck 5, while the gear table 13 is rotating. The parts of table 34 are so arranged, that one of the removable corner sections 36 is brought over the mouth of the feeding neck 5 as the gear table 13 is brought into a position having the bushing 19 in registration with the neck mold 5 and having the blank mold automatically closed with the port in the bottom of the mold chamber in registration with the bushing. The upper neck members 53 of the mold 37 are closed prior to the closing of the mold members 38 by the cam groove 62 and the slide member 59, as previously described, and held in said closed relation as the body members are closed thereover, the sprue 67 being projected slightly into the neck chamber to be within the upper portion of glass when the latter is fed into the mold. After the forming of the blank the table 34 continues to revolve until a proper contact is made through the solenoids controlling the blank mold, and the latter is opened exposing the blank so that the latter may have an opportunity to equalize its temperature prior to the blowing operation, the blank being held meanwhile by the neck mold members 53, which have remained closed during the opening of the blank mold members. Continuing in its travel, the arm 52 moves around the stationary spindle 33 until the bottle mold solenoids are energized to close the bottle mold over the blank, the neck portions of the bottle and blank molds being similarly constructed so that both mold members fit snugly over the closed neck members 53. Just as the bottle mold is closed, the sprue 67 is lowered and connection is made with the compresser so that the mouth sprue 67 moves downwardly in the blank form of glass, simultaneously blowing jets of air through the apertures in the lower end of the sprue 67 and blowing the bottle during my novel distribution of air. The active period of the sprue is comparatively short and it is then raised and shut off from the compressor by an automatic mechanism previously described. As the table continues its revolution, the solenoids controlling the bottle mold members, open said members to expose the bottle and when the bottle is carried over the delivery opening 39, the cam member on the stationary spindle rocks the arms controlling the mold neck, thereby opening the neck and releasing the bottle so that it will pass through the delivery opening onto the conveyer.

It is apparent that the mold table may be provided with as many sets of molds as may be desired and that the operation of each mold set is similar to that just described.

It is also apparent that but a single skimming mechanism is required, although the number of feeding openings in the skimming table may be determined by the gear connection with the table.

It will be apparent that the mechanism herein described for use in connection with an upward hydrostatic delivery of glass may also, without any departure from the spirit and scope of this invention, be used in connection with a downward hydrostatic delivery of flowing glass, or in connection with glass flowing downwardly under high velocity from a heated opening, where the retarding of flow while maintaining the same will be of equal importance as when feeding the glass upwardly. The severing action and removal of glass herein employed may of course be used in any connection where glass flows under pressure or with high velocity.

While I have described a specific form of solenoid and contact making and breaking mechanism, I do not wish to limit myself to this particular form, as its equivalent may be used, no invention being claimed herein to the specific form of these points.

Having thus described my invention, what I claim as new therein and desire to secure by Letters-Patent is:—

1. The combination with a glass furnace, of a conduit communicating with said furnace below its fluid level and having an upwardly facing delivery port positioned for discharging molten glass under hydrostatic pressure therefrom, a movable glass receptacle adapted to continuously receive and remove molten glass as it issues from said delivery port, whereby a continuous discharge of molten glass under hydrostatic pressure is diverted and moved transversely from said port, and means for operating said receptacle.

2. The combination with a glass furnace, of a conduit communicating with said furnace and adapted to convey molten glass therefrom, said conduit being provided with a delivery port, adapted for the continuous issuance of glass therethrough from said conduit, a partition receptacle in confined communication with said port adapted for the continuous reception and successive deflection, severing and removal of glass transversely to its flow from said port, as it issues therefrom, and means for operating said receptacle.

3. In a glass feeding apparatus, a glass furnace, a conduit communicating with said furnace, and for conveying glass therefrom, said conduit being provided with a discharge port for the issuance of glass therefrom, a device forming a confining continuation to said port, means on said device forming a series of pockets, adapted by movement thereof to continuously receive sever and divert molten glass issuing from said port, while traversing the same and means for operating said device.

4. In a glass molding apparatus, a glass furnace, a conduit having an upwardly facing delivery port, molds adapted for receiving molten glass through the port, and a skimmer adapted for removing molten glass from the port in advance of the mold to prevent the molten glass from congealing between intermittent feeding of the molds.

5. In a glass feeding apparatus, the combination with a neck and blank mold having an intake port in the bottom thereof, of a glass reservoir, a conduit connected with said reservoir for conveying molten glass therefrom, said conduit having a discharge port adapted by registration with said intake port to pass molten glass through said ports and an element covering said discharge port adapted to retard and to continuously divert, transversely, the passage of molten glass from said discharge port, by its movement across said discharge port, prior to feeding said mold and means for operating said element.

6. The combination with a conduit having a delivery port through which molten glass may be delivered under hydrostatic pressure, of a table adapted to travel over said port, a mold mounted in said table, a skimmer having openings for communication with a mold and conduit ports, said skimmer being adapted for travel between the said port and the said table whereby molten glass is carried off from the said port when the mold is not in position to receive glass therefrom.

7. In a glass feeding apparatus, a glass furnace, a conduit communicating with said furnace for carrying glass therefrom, said conduit being provided with a discharge port, a device forming a closed extension to said port and adapted to continuously remove glass from said port, and to divert the glass alternately in one, then the other of two directions and means for operating said device.

8. In glass molding apparatus, a glass furnace, a conduit leading from the furnace and having an unobstructed delivery port, a mold adapted for movement over the port and for receiving molten glass from the conduit through said port and means for removing molten glass from said port in advance of the mold.

9. In a glass handling apparatus, a glass melting receptacle, a conduit extending from said receptacle and adapted to convey glass therefrom and having a discharge port adapted to pass molten glass, glass forming means adapted for communication with said discharge port and to form a closed extension thereto, to receive glass therefrom, to sever and remove the received glass, during the continuous and uninterrupted issuance of molten glass from said port, and means for operating said glass forming means.

10. In a glass blowing apparatus, a heated conduit having a suitable delivery port and adapted for discharging flowing glass continuously, a mold adapted for intermittent communication with said port and a skimmer forming a confining extension to said port and adapted for removing and severing glass flowing from the port in advance of the mold, and to provide an inclosed passage for flowing glass between said port and said mold during their intermittent communication, and means for operating.

11. The combination with a mold, of a conduit having a port, a trough on said conduit into which said port is adapted for delivery, a mold positioned above said port adapted to receive glass therefrom, a member adapted to travel over said port, between the port and said mold, apertured projections on said member, positioned to move through said trough, and to register with said port and said mold for the passage of glass to said mold, and by its movement adapted to shear across said port, and means for operating said member.

12. The combination with a conduit, having a delivery port through which fluid is delivered under pressure, a mold adapted for intermittent communication with the conduit port to receive glass therefrom, of an apertured table adapted for travel over said port and having a skimming member whereby material is constantly carried off from the port, when the mold is not in position to receive glass from said port.

13. The combination with a conduit, having a suitable delivery port, of a mold adapted for receiving material from said port, and a skimming member movably mounted between the conduit and mold, said member having a depending boss adapted for travel over the port, and provided with skimming cups and with an aperture through which communication may be established between the conduit port and mold.

14. The combination with a conduit, having a vertical delivery port, of a revoluble mold table, having a mold adapted for receiving material vertically from the conduit port, an apertured skimmer interposed between the conduit and mold and having geared connection with the table, and a punch comprising a pivotally mounted member, having a head adapted for movement toward and from the skimmer, and having a trip dog and a gear member driven from the skimmer, and having a lug adapted for engagement with the punch dog, for the purpose set forth.

15. The combination with a conduit, having a vertical delivery port, of a revoluble mold table, having a mold adapted for receiving material vertically from the conduit port, an apertured skimmer interposed between the conduit and mold and having geared connection with the table, and a punch comprising a pivotally mounted member, having a head adapted for movement toward and from the skimmer, a trip dog and a depending arm, a guide member projecting loosely from said arm, springs at opposite sides of the arm and yieldingly retaining said punch in a set position and a gear operable from the skimmer, and having a lug adapted for operative engagement with the punch.

16. In a glass delivery and shaping device comprising a conduit having an upward delivery port, a skimming plate having a cupped skimming surface adapted for motion above the delivery port to remove small fractions of glass therefrom and having openings therethrough adapted to aline with the delivery opening of the conduit, a blank forming mold open at the bottom and mechanisms to simultaneously register the bottom opening of the blank mold and the opening in the skimming plate in linear alinement with the delivery openings of the conduit, for purpose of elevating a volume flow of glass under pressure into the interior of the blank forming mold.

17. In apparatus for the manufacture of glass articles, a conduit having an outlet and arranged to deliver flowing glass continuously, a series of molds adapted to successively momentarily register in operative receiving relation with the outlet, in combination with means interpositioned between the outlet and the mold for removing chilled glass from the outlet and admitting fresh portions of the molten glass into the molds, and to sever said fresh portions, from the chilled glass before and after admitting said flowing fresh glass into any of said molds.

18. The combination with a mold, of a conduit having a port, a trough on said conduit into which said port is adapted for delivery, a mold positioned above said port adapted to receive glass therefrom, a member adapted to travel over said port, between the port and said mold an apertured projection on said member, positioned to move through said trough, and to register with said port and said mold for the passage of glass to said mold, and by its movement adapted to shear across said port, and mold simultaneously.

19. The combination of a conduit having a delivery port, a mold, a skimming member adapted for travel over said port, and having a cupped opening therein, through which fluid is delivered from the said port into the said mold, said skimming member being adapted by movement to continuously remove glass issuing from said port, when said opening is not in registration with said port and mold, and means for jarring said member to free glass therefrom.

20. The combination of a feeding conduit, having an upwardly directed delivery port, a mold table having a plurality of molds therein adapted for receiving material from beneath the table, and a member movably mounted between the conduit and table whereby communication is established therebetween and whereby material is continuously removed from the conduit port, for the purpose set forth.

21. The combination with a conduit having a delivery port, of a mold adapted for receiving material from said port, a skimming member movably mounted between the conduit and the mold, said member having an apertured post on one side thereof and on the other side a boss adapted for travel over said port, for the passage of glass from said port and said boss being provided with a series of skimming partitions, for removing glass from said port in advance of the said mold, and means for operating said member.

22. The combination with a conduit having an upwardly directed port, of an arcuate trough inclosing said port, a mold having an intake port, and a revoluble skimmer interposed between the conduit and mold, and having a cupped boss adapted for travel in the arcuate trough, and having an opening for establishing communication between the conduit and mold, said trough with said opening being adapted for coöperation with said boss for the continuous conveying of glass from said port.

23. The combination with a conduit, of a revoluble mold table overlying the conduit, a revoluble member having geared connection with the table, and through which material is passed from the conduit to the mold and a skimming member carried by said member, for the purpose of affording a continuous delivery of glass from said port.

24. In a glass molding device, a glass melting furnace, a glass delivering part connected therewith and adapted to conduct and deliver molten glass vertically, a series of molds adapted to be successively brought into position to receive glass passing from said glass delivering part and to be charged thereby, glass dividing means positioned between said part and said series of molds, adapted to sever said glass after each mold has received its charge and to receive and divert the glass that flows from said part before a succeeding mold is brought into a receiving position, said means being adapted to sever the flowing glass at a fresh point to disconnect the diverted glass from the flowing glass before passing said flowing glass into any of said molds.

25. In a glass molding device, a glass melting furnace, a glass delivering part connected therewith and adapted to conduct and deliver molten glass vertically, a series of molds adapted to be successively brought into position to receive glass passing from said glass delivering part and to be charged thereby, glass dividing means positioned between said part and said series of molds, adapted to sever said glass after each mold has received its charge and to receive and divert the glass that flows from said part before a succeeding mold is brought into a receiving position, said means being adapted to sever the flowing glass a second time before passing the same into any of said molds, and performing said severing without interrupting the continuity of the flow of the glass along its vertical path.

26. In a glass machine, a table, a plurality of molds carried thereby and shaped to form the upper end of the finished article, a stem projected within the mold cavity of each shaping mold, a plurality of blow molds also carried by the table, a conduit having an upward directed delivery port, adapted to supply glass to said molds under hydrostatic pressure, a revoluble skimming plate above the said port adapted to remove glass from the port opening to prevent congealing while reducing or holding back the normal flow of glass issuing therefrom, and having openings adapted to intermittently connect the bottom openings of shaping molds with the delivery port of the conduit, to permit molten glass to enter and fill the shaping molds and surround the stems projected therein, thereby press-shaping the glass within the molds by the hydrostatic pressure exerted from glass in the conduit, means to successively blow the lower portion of the formed glass in the blow molds, and means to deliver the finished article to a carrier.

27. The combination with a continuous melting tank, of a heated conduit adapted for a continuous hydrostatically forced delivery of molten glass and having an upwardly directed delivery outlet, a member having a port surrounded by an extended rim, adapted to move into registration with said outlet, a shaping mold comprising separate upper neck members and lower blank members, and whose bottom opening is adapted to come in line with and communicate with the said port and delivery outlet and form a passage through which molten glass will arise from the said conduit into the neck formed portion of shaping mold to be shaped thereby, the bottom of said shaping mold being adapted to move transverse to said port, at the upper surface of the extended rim, for shearing off the glass evenly with the bottom opening of the shaping mold and severing the connection between the unformed glass in the port and outlet from the formed glass in the shaping mold, a body blow mold adapted for coöperation with the upper neck forming members of the shaping mold when the lower blank forming members of said mold are withdrawn, and means to subsequently blow and expand the blank formed portion of the glass within the body blow mold.

28. In a glass feeding apparatus, an externally heated glass conveying part adapted to deliver flowing glass continuously, a series of molds adapted to be successively arranged in position to be charged from said flowing glass, and glass diverting means interposed between said glass delivering part and said molds adapted to intermittently pass said flowing glass to each of said molds and to sever said flowing glass before and after each mold has received its quota of glass, and to divert and remove the glass that flows when the molds are not in position to receive the same.

29. In apparatus for making glass articles, a heated receptacle for molten glass adapted to receive a continuous inflow from a tank under a constant fluid pressure, and to discharge the same with high initial velocity through its lower opening, in combination with a cupped and apertured surface covering said opening and adapted to portion off and intermittently vary the flow of glass continuously discharging from the lower opening of said receptacle, and to successively sever the glass at said opening and periodically at a point distant from said opening in conjunction with periodically associating molding receptacles.

30. In a glass molding machine, the combination of an externally superheated conduit adapted for hydrostatic delivery of molten glass and having a contracted outlet, of a movable plate covering said outlet and having an apertured surface and adapted to permit a free hydrostatic delivery of glass from the outlet, while removing a fraction thereof in the apertured surface, and having projected bushed openings therethrough adapted for successive registry with the conduit outlet, a glass molding receptacle having operative relation with the plate and adapted to successively register their intake openings with the bushed openings of the plate and the outlet of the conduit, for the simultaneous forming of a free passage from the conduit for the delivery of molten glass under hydrostatic pressure to the receptacle, and coöperative means for severing the glass between the receptacle and the plate and between the plate and the outlet.

31. In a glass feeding apparatus, an additionally heated glass-conducting member having a delivery opening surrounded with a heated metallic surface, from which opening a stream of glass is adapted to flow, and glass receiving means comprising a series of adjoining receptacles divided by a series of partitions, each of which is adapted to move across said opening in contact with said surface to receive the stream of glass and sever the same into divided portions in a progressive gradual manner as the glass flows from the opening into adjoining receptacles.

32. In a glass feeding device, a part having a flow opening adapted to deliver a stream of glass and movable means operative with said part at the opening for progressively dividing said stream and removing predetermined quantities of the same, while affording clearance for the flow of the glass to deliver through and along the plane of division.

33. In a glass feeding device, a glass conducting medium having an opening through which the stream of glass issues, and glass receiving and shearing means comprising a series of adjoining cavities divided by cutting edges adapted to successively move across said opening to divide and sever said stream at said opening and periodically cut off mold charges therefrom during the continuous flowing of said glass into said means and while severing the stream at the opening.

34. In a glass feeding device, a port opening through which a stream of glass flows constantly, shearing means associated with said port comprising a series of partitions having straight and narrow cutting edges and adapted to continuously move across said opening in contact therewith to divide said flowing glass and successively sever the same into separate quantities during said movement and while the glass continues to flow through said opening during said severing.

35. In a glass working apparatus, means for flowing a stream of glass under a restraining pressure, and means associated therewith for successively severing and periodically dividing said stream while in motion to produce independent mold charges.

36. In a glass working apparatus, the combination of means for delivering a continuous stream of glass under forced pressure and movable means associated therewith for retarding without interrupting a constant progression of, and for continuously and simultaneously receiving the stream while periodically cutting the same to produce separated mold charges.

37. In a glass working apparatus, a glass furnace having an exit for affording a continuous flow of glass, and glass molding means coacting with the exit for simultaneously effecting the progressive reception and gradual division of the glass into separate quantities.

In testimony whereof I affix my signature in presence of two witnesses.

ENOCH T. FERNGREN.

Witnesses:
   LETA E. COATS,
   ARTHUR W. CAPS.